No. 863,623. PATENTED AUG. 20, 1907.
E. B. MOWER & E. JOHNSON.
NON-COLLAPSIBLE FLOAT.
APPLICATION FILED DEC. 26, 1906.
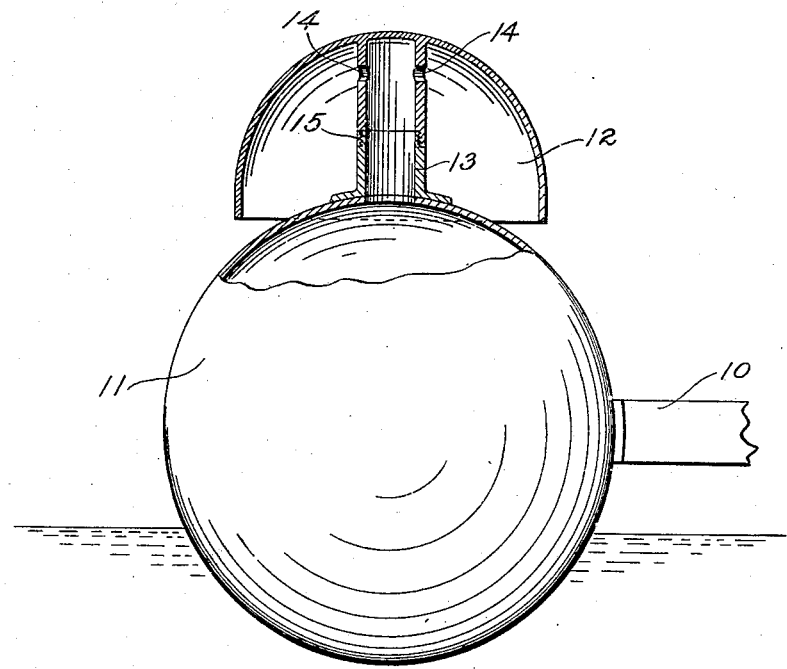
Witnesses:
L. L. Simpson
H. D. Kilgore
Inventors:
Eugene B. Mower,
Eleazer Johnson,
By their Attorneys
Williamson & Merchant

UNITED STATES PATENT OFFICE.

EUGENE B. MOWER AND ELEAZER JOHNSON, OF MINNEAPOLIS, MINNESOTA.

NON-COLLAPSIBLE FLOAT.

No. 863,623.  Specification of Letters Patent.  Patented Aug. 20, 1907.

Original application filed December 21, 1905, Serial No. 292,728. Divided and this application filed December 26, 1906.
Serial No. 349,393.

*To all whom it may concern:*

Be it known that we, EUGENE B. MOWER and ELEAZER JOHNSON, citizens of the United States, residing at Minneapolis, in the county of Hennepin and State of Minnesota, have invented certain new and useful Improvements in Non-Collapsible Floats; and we do hereby declare the following to be a full, clear, and exact description of the invention, such as will enable others skilled in the art to which it appertains to make and use the same.

This invention relates to floats such as used for opening and closing valves, and for other purposes, and has for its object to provide a float of this character which is non-collapsible, that is, which will not be crushed or collapsed when subjected to high pressure. This application is in the nature of a division of our copending application S. N. 292,728, filed December 21, 1905 and allowed June 28, 1906, entitled "Non-collapsible floats", and is directed to one form of the non-collapsible float broadly claimed in said earlier application.

The present invention is illustrated in the single view of drawing, which view shows the float partly in side elevation and partly in vertical section, some parts being broken away.

In the present application, as in our earlier application, the float comprises a main float 11 and a supplemental float 12 having an open bottom. In this form of the device, the supplemental float 12 is rigidly secured to the main float 11 by a tubular neck 13, the lower end of which opens directly into the said main float and which near its upper end is preferably provided with a plurality of air passages 14. Also preferably, the tubular neck 13 is divided, the sections thereof being connected by threaded engagement, as indicated at 15, so that the bell-shaped supplemental float 12, together with the upper extremity of the tubular neck 13, may be unscrewed and removed from the lower portion of said neck 13 and the main float 11. As shown, the main float 11 is connected to a lever or arm 10, which arm may be supported in any suitable way and may operate any suitable mechanism, such, for instance, as the valve shown in our said earlier application.

With this construction, when the float is confined within a boiler or other closed receptacle, containing steam or other fluid under high pressure, the said steam will freely enter the main float 11 through the perforations 14 and tubular neck 13, so that internal and accidental pressure on said main float will be equal and, hence, there will be no tendency to crush or collapse the said main float. When the water in the boiler or other confining receptacle rises on the main float to a point above the depending open edge of the supplemental float 12, the air caged or confined in said supplemental float will prevent the water from rising within the main float to the altitude of the perforations 14 and, hence, will prevent the water from entering the main float.

The float described is of very small cost and is highly efficient for the purposes had in view. It will be found useful in numerous places, such as in boilers, apparatus for dispensing beer, soda water and other carbonated drinks which are confined under high pressure in the containing receptacle from which they are drawn.

What we claim is:

1. The combination with a hollow main float, of a supplemental float rigidly connected thereto, and an air vent which is always open affording communication between the interior of said main float and the upper interior portion of said supplemental float, the said supplemental float having an open bottom, substantially as described.

2. The combination with a hollow main float, of a supplemental float that is open at its lower portion, and is rigidly connected to said main float, and an air vent affording communication between the interior of said main float and the upper interior portion of said supplemental float, substantially as described.

3. The combination with a main float 11, and an inverted supplemental float 12 that is open in its bottom, of a tubular neck 13 rigidly connecting said main and supplemental float and affording communication between the interior of said main float and the upper interior portion of said supplemental float, and which neck 13 is made up of sections rigidly but detachably connected by screw-threaded engagement, substantially as described.

In testimony whereof we affix our signatures in presence of two witnesses.

EUGENE B. MOWER.
ELEAZER JOHNSON.

Witnesses:
MALIE HOEL,
F. D. MERCHANT.